(12) United States Patent
Nowaczyk et al.

(10) Patent No.: US 10,309,517 B1
(45) Date of Patent: Jun. 4, 2019

(54) TRANSMISSION PUMP DRIVE ASSEMBLY

(71) Applicant: Ford Global Technologies, LLC, Dearborn, MI (US)

(72) Inventors: Kenneth Leon Nowaczyk, Algonac, MI (US); Brian J. Deurloo, Howell, MI (US); Brian Robert Black, Redford, MI (US); Tammy Miller, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/899,429

(22) Filed: Feb. 20, 2018

(51) Int. Cl.
| | |
|---|---|
| *F16H 57/031* | (2012.01) |
| *F16H 57/028* | (2012.01) |
| *F16H 57/04* | (2010.01) |
| *F16H 57/00* | (2012.01) |
| *B60K 6/405* | (2007.10) |
| *B60K 6/36* | (2007.10) |
| *B60K 6/547* | (2007.10) |
| *F16H 57/029* | (2012.01) |
| *F16B 4/00* | (2006.01) |
| *F16H 57/02* | (2012.01) |

(52) U.S. Cl.
CPC .......... *F16H 57/031* (2013.01); *B60K 6/36* (2013.01); *B60K 6/405* (2013.01); *B60K 6/547* (2013.01); *F16B 4/004* (2013.01); *F16H 57/0006* (2013.01); *F16H 57/028* (2013.01); *F16H 57/029* (2013.01); *F16H 57/0441* (2013.01); *F16C 2226/12* (2013.01); *F16H 2057/02043* (2013.01)

(58) Field of Classification Search
CPC ............ F16H 57/0006; F16H 57/0441; F16H 57/023; F16H 57/028; F16H 57/029; F16H 57/031; F16H 2057/02043; F16B 4/004; F16C 2226/12
USPC ................................................ 74/451, 606 R
See application file for complete search history.

(56) References Cited

U.S. PATENT DOCUMENTS

| | | | |
|---|---|---|---|
| 4,257,370 A | 3/1981 | Kasting | |
| 7,628,722 B2 | 12/2009 | Yoshimura | |
| 8,226,523 B2 | 7/2012 | Oomura | |
| 2005/0239591 A1* | 10/2005 | Schoenek | F16C 35/067 474/144 |
| 2016/0169368 A1* | 6/2016 | Mao | F16H 57/039 74/425 |
| 2018/0031078 A1* | 2/2018 | Bell | F16H 1/20 |
| 2018/0215255 A1* | 8/2018 | Kronsteiner | B60K 1/00 |
| 2018/0216717 A1* | 8/2018 | Thotakuri | F16H 57/0006 |

FOREIGN PATENT DOCUMENTS

| | | |
|---|---|---|
| CN | 203161528 U | 8/2013 |
| DE | 202015000572 U1 | 6/2016 |

* cited by examiner

*Primary Examiner* — Prasad V Gokhale
(74) *Attorney, Agent, or Firm* — David Kelley; Brooks Kushman P.C.

(57) ABSTRACT

An off-axis transmission pump is driven via an idler gear. To reduce the transmission of gear noise, the idler gear is supported by a plastic cover. The plastic cover includes a molded-in metal insert to harden the cover in the vicinity of the idler gear. The metal insert may include inner and outer sleeves which may be connected by radially extending arms. The plastic cover is located relative to a front cover by at least two locating features.

20 Claims, 5 Drawing Sheets

TRANSMISSION PUMP DRIVE ASSEMBLY

TECHNICAL FIELD

This disclosure relates to the field of transmission systems. More particularly, the disclosure pertains to a method of assembling a transmission pump drive to reduce structure-born gear noise.

BACKGROUND

Automatic transmission fluid serves many functions in a modern automatic transmission. Pressurized fluid may be used to engage friction clutches in order to establish a power flow path with a desired speed ratio. Fluid lubricates gears and bearings. Excess heat is removed by fluid flowing over various components. The fluid is typically pressurized by a pump driven by the transmission input. Sometimes, the pump is located on the transmission input axis, but that restricts the pump geometry. Pump efficiency is improved by locating the pump off-axis. However, locating the pump off-axis necessitates some form of pump drive that diverts power from the transmission input shaft to the pump. When gears are used, they can generate gear noise. If the gear noise is transmitted to vehicle occupants, the occupants may be annoyed.

SUMMARY OF THE DISCLOSURE

A transmission includes an idler gear, a plastic cover, and a bearing. The idler gear is configured to transmit power from an input shaft to a pump. The plastic cover includes a molded-in metal insert. An inner race of the bearing is press-fit on the metal insert. An outer race of the bearing is press fit into the idler gear. The molded-in metal insert may be a single piece. In other embodiments, the molded-in insert may include an inner sleeve adjacent to the bolt and an outer sleeve onto which the bearing inner race is press-fit. The inner sleeve and the outer sleeve may be connected by a plurality of radial metal arms. The transmission may also include a front support and a bolt extending through the metal insert into the front support to fasten the plastic cover to the front support. An O-ring seal may surround the bolt between the front support and the plastic cover. The plastic cover may define at least two locating features that interface with corresponding features of the front support to locate the idler gear relative to the front support.

A method of assembling a transmission starts with a plastic cover having a molded-in metal insert. An idler gear is then rotatably supported on the metal insert. For example, the idler gear may be press-fit onto an outer bearing race and the inner bearing race may be press-fir on the metal insert. The plastic cover is positioned relative to a front support using locating features on the plastic cover and front support. A bolt is tightened through the metal insert into the front support. A pump drive gear may be installed over a stator support of the front support before positioning the plastic cover relative to the front support. An O-ring may be installed between the plastic cover and the front support. A mechanical pump assembly may be installed such that a pump driven gear fixed to the pump meshes with the idler gear.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
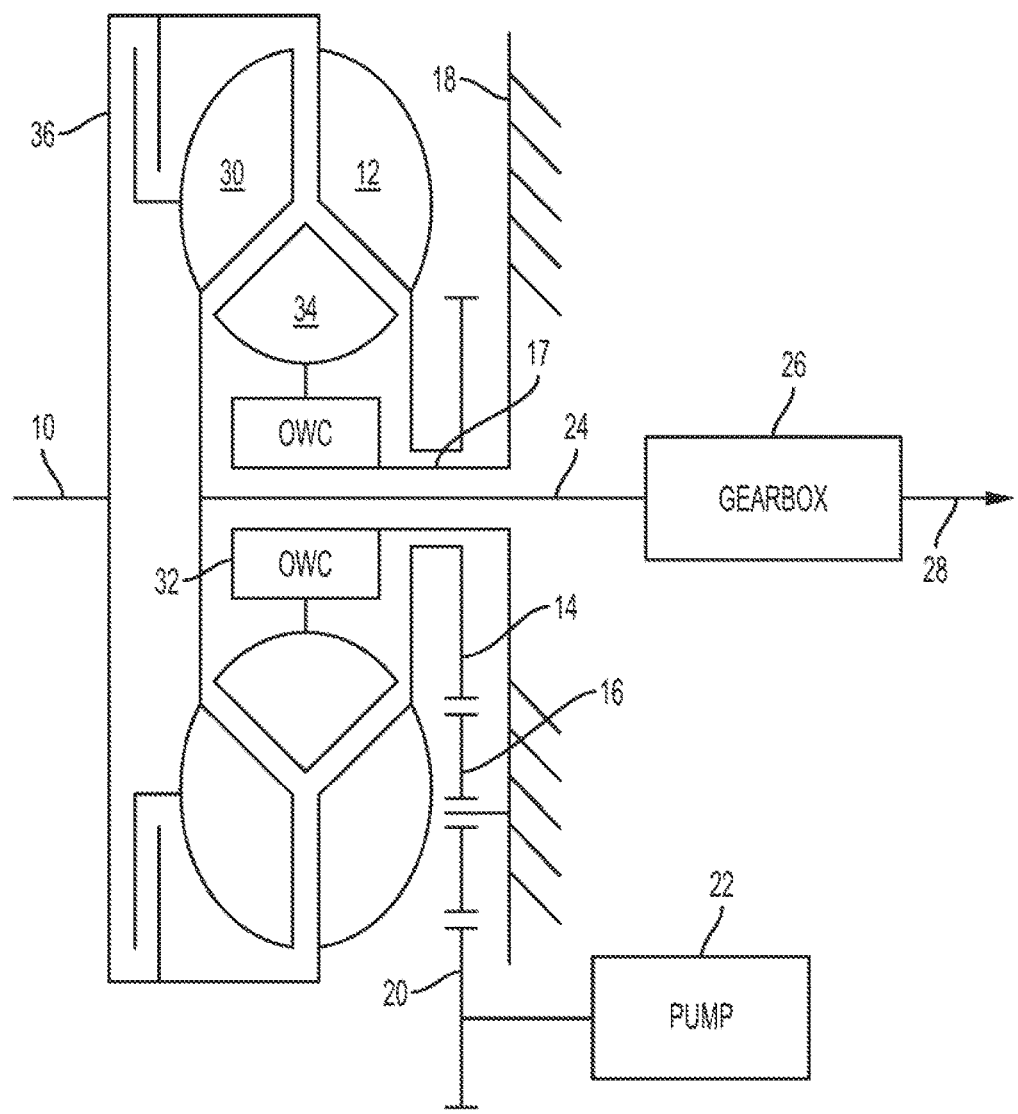
FIG. 1 is a schematic diagram of a vehicle transmission.

FIG. 1 schematically illustrates a transmission having a gear-driven off-axis pump. Power is supplied at input shaft 10, preferably by an internal combustion engine. Input shaft 10 is fixed to impeller 12 and to pump drive gear 14. Pump drive gear meshes with idler gear 16 which is supported for rotation by front cover 18. Front cover is held stationary relative to vehicle structure, possible via other stationary transmission components such as a transmission case. Idler gear 16, in turn, meshes with pump driven gear 20 which is fixed to the shaft of mechanical pump 22.

The majority of power from input shaft 10 is transmitted to turbine shaft 24. Gearbox 26 transmits power from turbine shaft 24 to output shaft 28 at a variety of speed ratios. At low vehicle speeds, power is transmitted from input shaft 10 to turbine shaft 24 hydro-dynamically. Impeller 12 propels fluid into turbine 30, imparting torque on turbine shaft 24. When the speed of turbine 30 is low relative to the speed of impeller 12, one-way-clutch 32 holds stator 34 stationary. Under these conditions, stator 34 redirects the fluid such that the torque exerted on turbine 30 is higher than the torque on impeller 12. As the speed of turbine 30 nears the speed of impeller 12, one-way-clutch 32 overruns. At higher vehicle speeds, lock-up clutch 36 may be engaged to transmit the power more efficiently from input shaft 10 to turbine shaft 24.

When power is transmitted via idler gear 16 to the pump, gear noise may be generated. If this gear noise is transmitted to vehicle occupants, they may find it unpleasant. Minimizing the quantity of noise generated requires accurate location of the idler gear center of rotation relative to gears 14 and 18. However, the inventors have determined that some methods of supporting idler gear 16 on front support 18 result in a high degree of sound transmission through the front support.

Figure 2:
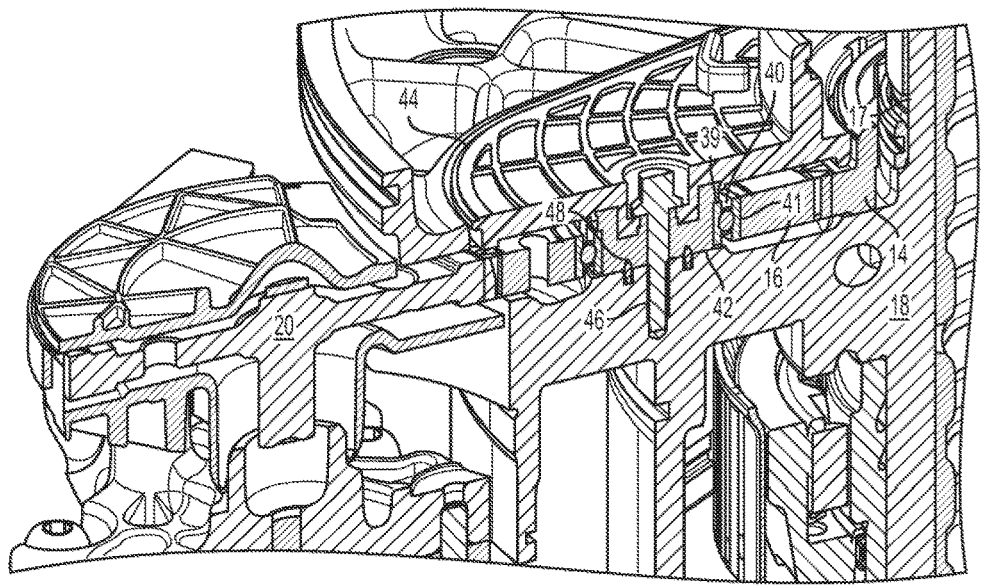
FIG. 2 is a cut-away view of a portion of the pump drive system of the transmission of FIG. 1.
Figure 3:
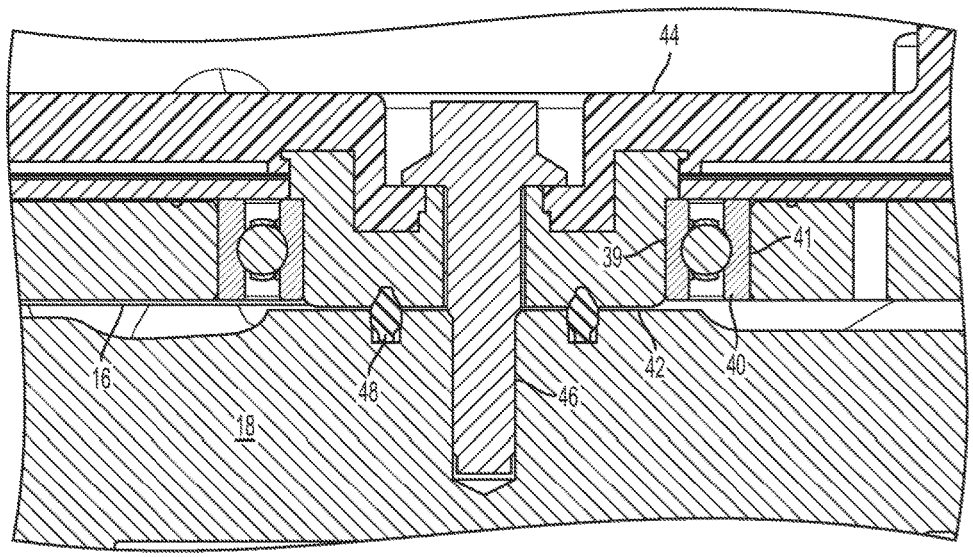
FIG. 3 is a detailed cross section of the pump drive system of FIG. 2.

FIG. 2 is a cut-away view illustrating the structure of some of the gear drive system for the pump. Idler gear 16 is supported, via bearing 40, on metal insert 42. Bearing 40 includes inner race 39 and outer race 41. Metal insert 42 is molded into plastic cover 44. Plastic cover 44 is fastened to front support 18 by bolt 46. A rubber O-ring 48 is installed between front support 18 and metal insert 42 around bolt 46. FIG. 3 is a cross sectional view showing these details at a larger scale. Notice that noise transmission from bearing 40 to external components (that could radiate the noise to the air) is limited. Noise transmission from metal insert 42 to front support 18 would need to cross over the boundary between these components. That boundary includes the compressible O-ring 48. Plastic cover 44 limits noise transmission because plastic is a less efficient transmission medium than metal. A slight gap separates the inner portion of metal insert 42 from bolt 46, thus limiting that noise path.

Figure 4:
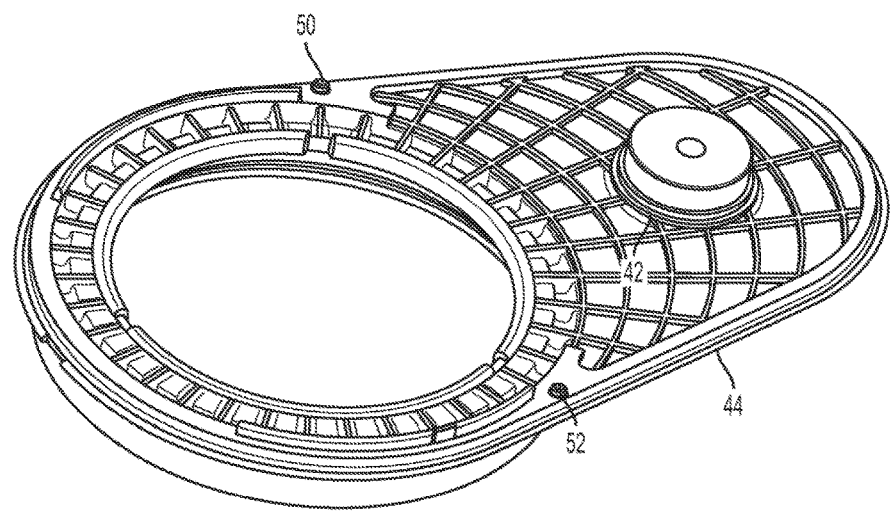
FIG. 4 is a pictorial view of the plastic cover of the pump drive system of FIG. 2.

FIG. 4 shows a pictorial view of the plastic cover 44 with the molded-in metal insert 42. In FIG. 4, the side of the plastic cover that faces front support 18 is shown on top. Plastic cover 44 includes two locating pins 50 and 52. These locating pins fit into corresponding depressions in front support 18, establishing the axis or rotation of gear 16 with respect to front support 18. As a result, bolt 46 does not need to establish this centerline.

Figure 5:
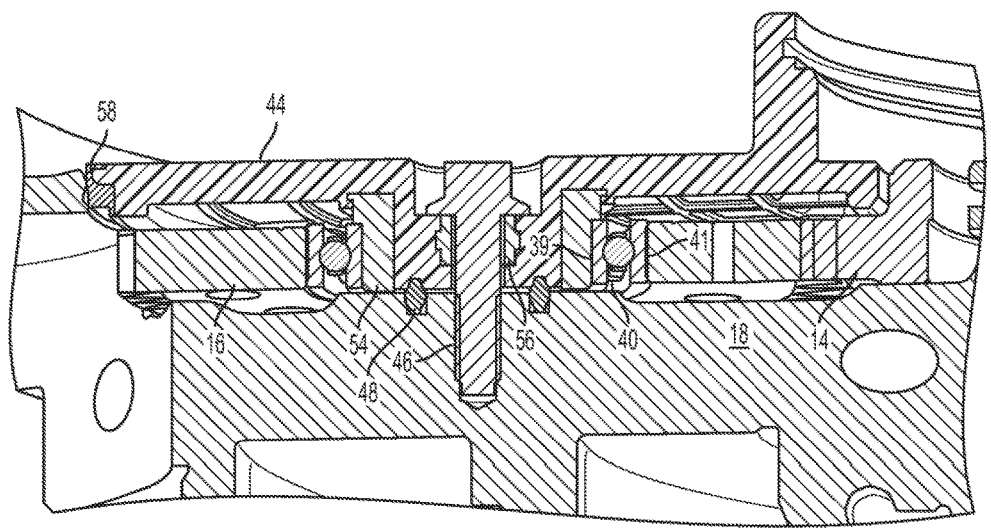
FIG. 5 is a cut-away view of an alternate embodiment of the pump drive system of the transmission of FIG. 1.

FIG. 5 shows a cut-away view of an alternate embodiment. Instead of a solid metal insert 44, this embodiment uses an outer sleeve 54 and an inner sleeve 56. Both of these sleeves are molded into plastic cover 44. Outer sleeve 54 provides a rigid surface for mounting the inner race of bearing 40. Inner sleeve 56 stiffens plastic cover 44 in the area of bolt 46 to avoid excessive stress in the plastic as bolt 46 is tightened. Inner sleeve 56 may extend all the way through the plastic material and contact front cover 18 in the installed position. A slight gap is present between outer sleeve 54 and front support 18, reducing noise transmission from bearing 40 to front support 18. FIG. 5 also shows the rim seal 58 between the outer perimeter of plastic cover 44 and front support 18. Rim seal 58, like O-ring 48, is made of a compliant rubber material that dramatically reduces transmission of sound from plastic cover 44 to front support 18.

Figure 6:
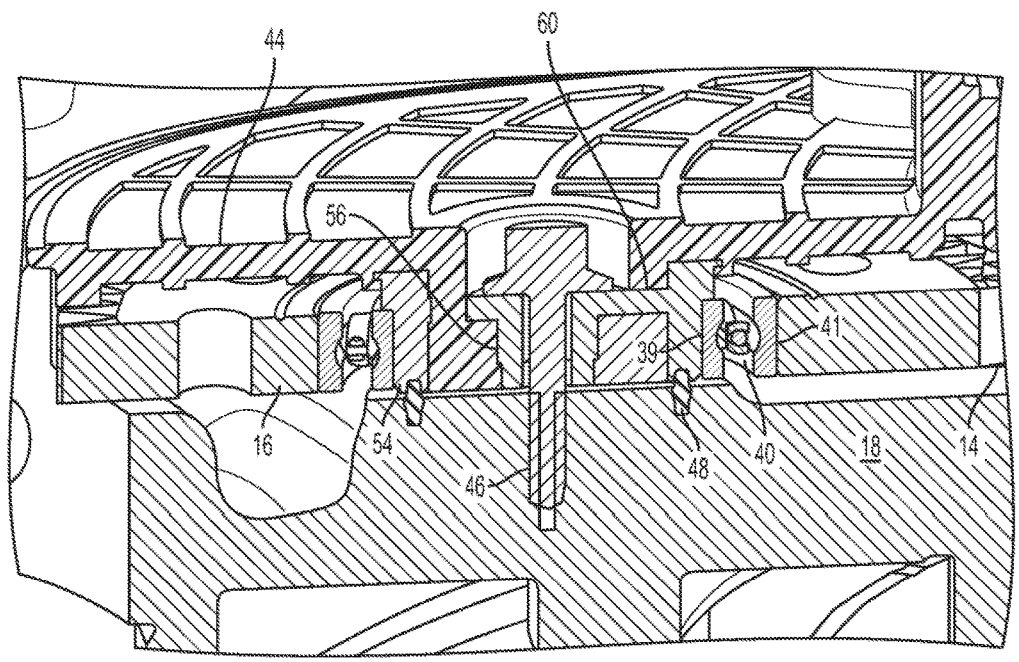
FIG. 6 is a cut-away view of a second alternate embodiment of the pump drive system of the transmission of FIG. 1.

FIG. 6 is a cut-away view of another alternate embodiment. In this embodiment, inner sleeve 56 is linked to outer sleeve 54 by a series of arms 60. This permits the sleeves to be manufactured as a single piece, simplifying assembly. The single piece is pictorially illustrated in FIG. 8. Plastic flows through the gaps between the arms 60 when the plastic cover 44 is formed. The narrow cross-section of the arms 60 limits the transmission of noise.

Figure 7:
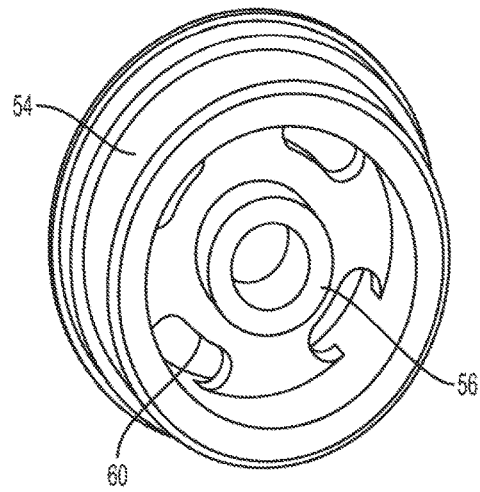
FIG. 7 is a pictorial view of the metal insert of the pump drive system of FIG. 6.
Figure 8:
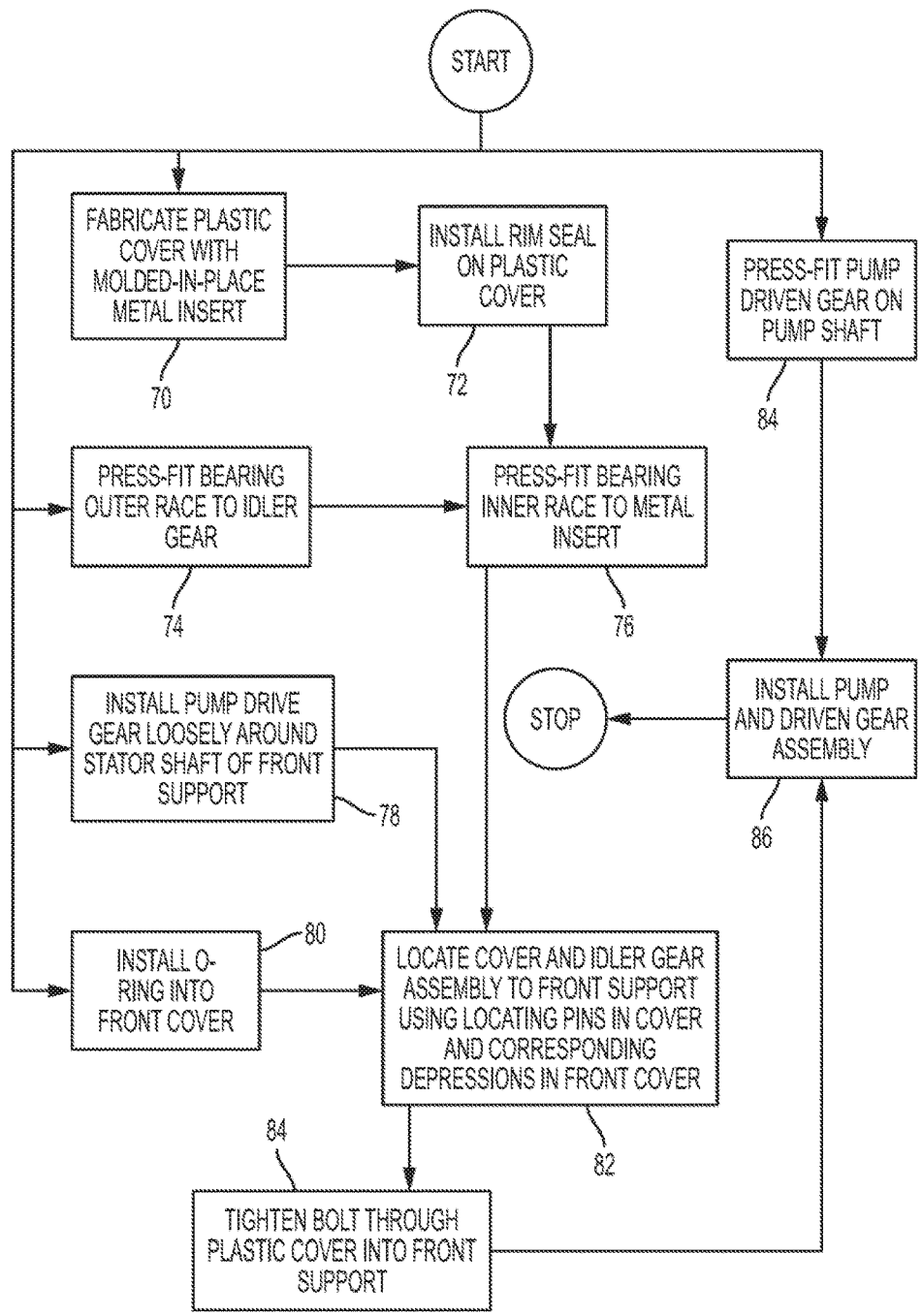
FIG. 8 is a flow chart for assembling the pump drive system according to FIG. 2, FIG. 5, or FIG. 6.

FIG. 8 is a flow chart for a process of assembling a pump drive system of a transmission. At 70, plastic cover is fabricated, for example by injection molding, with the metal insert(s) in place. The metal insert may be single piece insert illustrated in FIGS. 2 and 3, the separate sleeves illustrated in FIG. 5, or the single piece insert illustrated in FIGS. 6 and 7. At 72, the rim seal 58 is installed on plastic cover 44. At 74, the outer race of bearing 40 is press-fit to idler gear 16. At 76, the inner race of bearing 40 is press-fit onto the metal insert. These steps complete sub-assembly of the plastic cover and the idler gear.

At 78, pump drive gear 14 is installed loosely around the stator support portion 17 of front support 18. The connection between pump drive gear 14 and impeller 12 will be established later when the torque converter is installed. At 80, O-ring 48 is installed into front support 18. At 82, the sub-assembly of plastic cover 44 and idler gear 16 is fit onto front support 18, using locating pins 50 and 52. The mesh between pump drive gear 14 and idler gear 16 is established at this step. It may be necessary to rotate gear 14 slightly to mesh these gears. At 84, bolt 46 is inserted and tightened into front support 18 to secure the plastic cover 44 and idler gear 16. At 84, pump driven gear 20 is press-fit on the shaft of pump 22. At 86, the pump and driven gear are installed into the transmission. At this step, the gear mesh between gears 16 and 20 is established.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   an idler gear configured to transmit power from an input shaft to a pump;
   a plastic cover including a molded-in metal insert; and
   a bearing having an inner race press-fit on the metal insert and an outer race press fit into the idler gear.

2. The transmission of claim 1 further comprising:
   a front support; and
   a bolt extending through the metal insert into the front support to fasten the plastic cover to the front support.

3. The transmission of claim 2 further comprising a seal surrounding the bolt between the front support and the plastic cover.

4. The transmission of claim 2 wherein the plastic cover defines at least two locating features that interface with corresponding features of the front support to locate the idler gear relative to the front support.

5. The transmission of claim 2 wherein the molded-in metal insert is a single piece.

6. The transmission of claim 2 wherein the molded-in metal insert comprises:
   an inner sleeve adjacent to the bolt; and
   an outer sleeve onto which the bearing inner race is press-fit.

7. The transmission of claim 6 wherein the inner sleeve and the outer sleeve are connected by a plurality of radial metal arms.

8. A method of assembling a transmission comprising:
   providing a plastic cover having a molded-in metal insert;
   rotatably supporting an idler gear on the metal insert;
   positioning the plastic cover relative to a front support using locating features on the plastic cover and front support; and tightening a bolt through the metal insert into the front support.

9. The method of claim 8 wherein rotatably supporting the idler gear on the metal insert comprises:
   press-fitting an inner bearing race onto the metal sleeve; and
   press-fitting an outer bearing race into the idler gear.

10. The method of claim 8 wherein the front support includes a stator support and the method further comprises installing a pump drive gear over the stator support before positioning the plastic cover relative to the front support.

11. The method of claim 8 further comprising installing a seal between the plastic cover and the front support.

12. The method of claim 8 further comprising installing a mechanical pump assembly such that a pump driven gear fixed to the pump meshes with the idler gear.

13. A transmission comprising:
   a front support defining an opening;
   a cover sealing the opening via a compliant seal;
   an idler gear configured to transmit power from an input shaft to a pump; and
   a bearing having an inner race supported against rotation on the cover and an outer race fixed to the idler gear.

14. The transmission of claim 13 further comprising a bolt extending through the cover into the front support to fasten the cover to the front support.

15. The transmission of claim 14 further comprising a seal surrounding the bolt between the front support and the cover.

16. The transmission of claim 13 wherein the cover defines at least two locating features that interface with corresponding features of the front support to locate the idler gear relative to the front support.

17. The transmission of claim 13 wherein the cover is a plastic cover including a molded-in insert.

18. The transmission of claim 17 wherein the molded-in insert is a single piece.

19. The transmission of claim 17 wherein the molded-in insert comprises:
   an inner sleeve adjacent to the bolt; and
   an outer sleeve onto which the bearing inner race is fixed.

20. The transmission of claim 19 wherein the inner sleeve and the outer sleeve are connected by a plurality of radial arms.

\* \* \* \* \*